US00RE39907E

(19) United States
(12) Reissued Patent
Hong

(10) Patent Number: US RE39,907 E
(45) Date of Reissued Patent: Nov. 6, 2007

(54) TOLERANCE BASED MOTION CONTROL SYSTEM

(75) Inventor: Jiawei Hong, Brooklyn, NY (US)

(73) Assignee: Hurco Companies, Inc., Indianapolis, IN (US)

(21) Appl. No.: 10/453,090

(22) Filed: Jun. 3, 2003

Related U.S. Patent Documents

Reissue of:
(64) Patent No.: 6,242,880
Issued: Jun. 5, 2001
Appl. No.: 09/388,114
Filed: Sep. 1, 1999

U.S. Applications:
(60) Provisional application No. 60/099,625, filed on Sep. 8, 1998.

(51) Int. Cl.
*G05B 13/00* (2006.01)

(52) U.S. Cl. ..... 318/571; 318/572; 318/573; 700/150; 700/189

(58) Field of Classification Search ..... 700/159, 700/189; 318/565–574
See application file for complete search history.

(56) References Cited

U.S. PATENT DOCUMENTS

| | | | | |
|---|---|---|---|---|
| 3,576,979 A | | 5/1971 | McCall et al. | |
| 3,602,090 A | | 8/1971 | Whetham | |
| 3,679,955 A | | 7/1972 | Rhoades | |
| 3,728,595 A | | 4/1973 | Adams | |
| 3,849,712 A | | 11/1974 | Lankford et al. | |
| 3,860,805 A | | 1/1975 | Strukel | |
| 3,882,304 A | * | 5/1975 | Walters | 700/163 |
| 4,131,837 A | * | 12/1978 | Whetham | 318/571 |
| 4,208,718 A | * | 6/1980 | Chung | 700/173 |

(Continued)

FOREIGN PATENT DOCUMENTS

WO WO 92/22023 A1 * 12/1992

OTHER PUBLICATIONS

Chaung, Hua–Yi and Liu, Change–Haun, A Model–Referenced Adaptive Control Strategy for Improving Contour of Multiaxis Machine Tools, IEEE Transactions on Industry Applications, vol. 28., No. 1., Jan./Feb. 1992.

Goto, Satoru and Nakamura, Masatoshi, Accurate Contour Control of Mechatronic Servo Systems Using Gaussian Networks, IEEE Transactions on Industrial Electronics, vol. 43., No. 4, Aug. 1996.

Yeh, Syh–Shiuh and Hsu, Pau–Lo, A New Approach to Biaxial Cross–coupled Control, Proceedings of the 2000 IEEE, International Conference on Control Applications, Anchorage, Alaska USA, Sep. 25–27, 2000.

Hsieh, Chen–Chou, Wang, An–Ping and Hsu, Pau–Lo, CAN–Based Motion Control Design, SICE Annual Conference in Fukui, Aug. 4–6, 2003, Fukui University, Japan.

(Continued)

*Primary Examiner*—Paul Ip
(74) *Attorney, Agent, or Firm*—Baker & Daniels LLP

(57) ABSTRACT

The present invention involves a tolerance based motion controller. The controller is capable of processing a group of tolerance constraints. The tolerance constraints specify where and when each tolerance constraint is to be applied, along with the information specifying the desired trajectory of motion. There are also a group of velocity constraints, specifying the maximum allowable velocity at each point along the desired trajectory. This information along with sensor feedback is used to modify the velocity along the actual trajectory of motion. This results in the time required traverse the trajectory being as short as possible. Also, the actual trajectory of motion should never exceed the permissible deviation from the desired trajectory, as specified by the tolerance constraints, with the velocity always being bounded by the specified velocity constraint.

77 Claims, 6 Drawing Sheets

U.S. PATENT DOCUMENTS

| | | | | | |
|---|---|---|---|---|---|
| 4,433,382 | A | | 2/1984 | Cunningham et al. | |
| 4,542,471 | A | | 9/1985 | Inaba et al. | |
| 4,543,625 | A | * | 9/1985 | Nozawa et al. | 700/174 |
| 4,571,686 | A | * | 2/1986 | Torisawa | 700/175 |
| 4,616,326 | A | * | 10/1986 | Meier et al. | 700/258 |
| 4,723,203 | A | | 2/1988 | Kishi et al. | |
| 4,728,872 | A | * | 3/1988 | Kishi et al. | 318/568.18 |
| 4,750,105 | A | | 6/1988 | Ohkawa et al. | |
| 4,763,276 | A | | 8/1988 | Perreirra et al. | |
| 4,797,835 | A | * | 1/1989 | Kurami et al. | 700/252 |
| 4,833,617 | A | | 5/1989 | Wang | |
| 4,835,710 | A | | 5/1989 | Schnelle et al. | |
| 4,884,373 | A | | 12/1989 | Suzuki et al. | |
| 4,908,555 | A | | 3/1990 | Ikeda et al. | |
| 4,959,597 | A | | 9/1990 | Kawamura et al. | |
| 4,963,805 | A | | 10/1990 | Suzuki et al. | |
| 4,973,895 | A | * | 11/1990 | Torii et al. | 318/567 |
| 5,028,855 | A | * | 7/1991 | Distler et al. | 700/187 |
| 5,060,164 | A | | 10/1991 | Yoneda et al. | |
| 5,117,169 | A | * | 5/1992 | Kakino et al. | 318/578 |
| 5,134,570 | A | | 7/1992 | Nankaku | |
| 5,179,514 | A | | 1/1993 | Rastegar et al. | |
| 5,198,984 | A | * | 3/1993 | Yamaguchi et al. | 700/188 |
| 5,287,049 | A | * | 2/1994 | Olomski et al. | 318/568.1 |
| 5,334,918 | A | | 8/1994 | McMurtry et al. | |
| 5,375,064 | A | * | 12/1994 | Bollinger | 700/188 |
| 5,493,502 | A | | 2/1996 | Niwa | |
| 5,682,319 | A | * | 10/1997 | Boland et al. | 700/189 |
| 5,687,084 | A | | 11/1997 | Wertz | |
| 5,723,961 | A | | 3/1998 | Fujino et al. | |
| 5,827,020 | A | * | 10/1998 | Fujita et al. | 409/80 |
| 5,828,574 | A | | 10/1998 | Robinson et al. | |
| 5,946,449 | A | | 8/1999 | Dickerson et al. | |
| 6,064,168 | A | * | 5/2000 | Tao et al. | 318/568.21 |
| 6,163,735 | A | | 12/2000 | Yamada et al. | |
| 6,310,621 | B1 | * | 10/2001 | Gagne et al. | 345/440 |
| 6,317,646 | B1 | * | 11/2001 | de Caussin et al. | 700/173 |
| 6,368,879 | B1 | | 4/2002 | Toprac | |
| 6,400,998 | B1 | * | 6/2002 | Yamazaki et al. | 700/86 |
| 6,401,004 | B1 | * | 6/2002 | Yamazaki et al. | 700/159 |
| 6,456,897 | B1 | | 9/2002 | Papiernik et al. | |
| 6,470,225 | B1 | | 10/2002 | Yutkowitz | |
| 6,493,602 | B1 | * | 12/2002 | Kranitzky et al. | 700/180 |
| 6,671,571 | B1 | * | 12/2003 | Matsumiya et al. | 700/172 |
| 6,774,598 | B1 | | 8/2004 | Kohler et al. | |
| 6,879,874 | B2 | * | 4/2005 | Sinn | 700/181 |
| 6,922,606 | B1 | * | 7/2005 | Yutkowitz | 700/187 |
| 6,999,841 | B1 | | 2/2006 | Rutkowski | |
| 7,012,395 | B2 | | 3/2006 | Haunerdinger et al. | |
| 7,016,763 | B2 | | 3/2006 | Fauser | |
| 2005/0049743 | A1 | | 3/2005 | Fauser et al. | |
| 2005/0190185 | A1 | | 9/2005 | Fauser et al. | |
| 2005/0251030 | A1 | | 11/2005 | Azar | |

OTHER PUBLICATIONS

Chen, Shyh–Leh, Liu, Hung–Liang and Ting, Sing Ching, Contouring Control of Biaxial Systems Based on Polar Coorinates, IEEE/ASME Transactions on Mechatronics, vol. 7., No. 3., Sep. 2002.

Chiu, George T.–C., and Tomizuka, Masayoshi, Contouring Control of Machine Tool Feed Drive Systems: A Task Coordinate Frame Approach, IEEE Transactions on Control Systems Technology, vol. 9., No. 1., Jan. 2001.

Li, Perry Y., Coordinated Contour Following Control for Machining Operations—A survey, Proceedings of the American Control Conference, San Diego, California, Jun. 1999.

Yeh, Zong–Mu, Cross–Coupled Fuzzy Logic Control for Biaxial Servomechanisms, IEEE 1996.

Yeh, Syh–Shiuh and Hsu, Pau–Lo, Estimation of the Contouring Error Vector for the Cross–Coupled Design, IEEE/ASME Transactions on Mechatronics, vol. 7., No. 1., Mar. 2002.

Xiao, Yong, Zhu, Kuanyi and Liaw, Hwee Choo, Generalized synchronization control of multi–axis motion systems, www.sciencedirect.com, Control Engineering Practice 13 (2005) 809–819.

Lacerda, Helder Barbieri and Belo Eduardo Morgado, A Modified Contour Error Controller for a High Speed XY Table, Journal of the Brazilian Society of Mechanical Sciences, vol. 22., Issue 3, 2000.

Lee, Hyun C. and Jeon, Gi J, Real–time Compensation of Two–dimensional Contour Error in CNC Machine Tools, Proceedings of the 1999 IEEE/ASME International Conference on Advanced Intelligent Mechatronics, Sep. 19–23, 1999, Atlanta, USA.

Wang, Lisong and Zhang, Zing, The Research of Static De–coupled Contour Control Technique of the Ultra–precision Machine Tool, Proceedings of the 5th World Contress on the Intelligent Control and Automation, Jun. 15–19, 2004 China .

Yeh, Syh–Shiuh and Hsu, Pau–Lo, Theory and Applications of the Robust Cross–Coupled Control Design, Proceedings of the American Control Conference, Albuquerque, New Mexico, Jun. 1997.

Imamura, Fumihiko and Kaufman, Howard, Time Optimal Contour Tracking for Machine Tool Controllers, IEEE Control Systems, Apr. 1991.

Jon Kieffer, Aidan J. Cahill, and Matthew R. James, "Robust and Accurate Time–Optimal Path–Tracking Control for Robot Manipulators," IEE Transactions on Robotics and Automation, vol. 13, No. 6, Dec. 1997.

Jon Kieffer, Aidan J. Cahill, and Matthew R. James, "Time–Optimal Path Tracking to a Specified Tolerance in the Presence of Plant Uncertainty," Australian National University.

L. M. Galantucci, L. Tricarico, and A Dersha, "Automatic Clamping Selection in Process Planning using Tolerance Verification Algorithms," Advanced Manufacturing Systems and Technology, Springer Verlag, Wein, New York, 1996.

Ales Hace, et al., "Robust Motion Control and Trajectory Planning for Planar Laser Cutting System," IEEE Advanced Motion Control Proceedings Coimbra, 1998.

Hong C. Zhang amd J. Mei, "Automated Tolerance Analysis for CAPP System," International Journal of Advance Manufacturing Technology, 10:219–224, 1995.

Parimal Kopardekar and Sam Anand, "Tolerance Allocation Using Neural Networks," International Journal of Advance Manufacturing Technology, 10:269–276, 1995.

M. M. Sfantsikopoulos, et al., "Concurrent Dimensioning for Accuracy and Cost," International Journal of Advance Manufacturing Technology, 10:263–268, 1995.

O. H. Chai, et al., "An Interpolation Scheme for Tool–Radius Compensated Parabolic Paths for CNC," IIE Transactions, 28:11–17, 1996.

Y. D. Chen, J. NI, and S. M. Wu, "Real–Time CNC Tool Path Generation for Machining IGES Surfaces," Transactions of the ASME, vol. 115, Nov. 1993.

G. S. Li, et al., "In–Process Drilling States Monitoring in Machine Centre by Time Series Analysis," International Conference on Manufacturing Automation, vol. 1712, 1992.

* cited by examiner

TOLERANCE BASED MOTION CONTROL SYSTEM

Matter enclosed in heavy brackets [ ] appears in the original patent but forms no part of this reissue specification; matter printed in italics indicates the additions made by reissue.

This appln claims the benefit of Provisional No. 60/099,625 filed Sep. 8, 1998.

BACKGROUND OF THE INVENTION

1. Field of the Invention

This invention relates to motion control systems. More particularly, this invention relates to computer-controllable machine tools.

2. Description of the Related Art

Automation has resulted in the development of motion controllers capable of signaling actuator devices to effect motion in linkages along a desired trajectory performing useful work. Motion controller permits increased speed and precision in performing a given task over manual operation. Robots and automated manufacturing equipment are examples of a few of the products that utilize motion control technology. Programming these devices are frequently accomplished by specifying the desired trajectory as a collection of line/arc segments, along with the desired velocity of each segment. With complex trajectories the velocities for each segment or group of segments is often a constant as optimization along each point in the trajectory would be very time consuming.

Most trajectory programmers have a fundamental understanding of the trade off between velocity and accuracy. They know that at higher velocities it becomes more difficult for the control to stay on the desired trajectory and thus trajectory programmers must make a trade off between the velocity and the precision of motion along the desired trajectory. These decisions are often based on the programmer's experience and result in an iterative programming process where the trajectory is executed and then modified to reduce the velocity in sections where an undesirable deviation from the desired trajectory is observed. Thus programmers control the deviation from the desired trajectory, and therefore the quality of the motion, by manipulating the velocity along the trajectory.

Nowhere is the attempt to maximize the velocity of motion control while minimizing the deviation from the desired trajectory more apparent than with motion control systems for manufacturing equipment often referred to as Computer Numerical Controllers (CNC). CNCs may be used to control manufacturing equipment such as lathes, grinders and mills. CNCs are computing devices adapted for the real-time control of machine tools. A numerical controller receives a set of coded instructions forming a part program. Part programs are frequently expressed in a standard G&M code language, or a close derivative of this language based on either the International Standards Organization (ISO) or the Electronics Industries Association (EIA) RS-274-D, using codes identified by letters such as G, M, F. The codes define a sequence of machining operations to control motion in the manufacture of a part. The numerical controller converts the codes to a series of electrical signals which control motors attached to a machine tool effecting the motion of the tool along the programmed trajectory.

A motion controller operating a milling machine is one example of CNC. Lathes grinders and coordinate measuring machines (CMMs) are other examples of manufacturing equipment which utilize a CNC for motion control. A 3-axis CNC milling machine has a head where a tool is mounted, a table movable relative to the tool in the X, Y plane. Motors control motion of the table in the X and Y directions and motion of tool in the Z direction, establishing an orthogonal X, Y, Z Cartesian coordinate system. Positional sensors (encoders or scales typically) provide feedback indicating the position of the tool with respect to the coordinate system of the milling machine. The CNC reads in a part program specifying a toolpath trajectory that the tool is to follow at a specified velocity or feedrate. The controller continuously compares the current tool position with the specified toolpath, and generates signals to control motors in such a way that the tool's actual trajectory matches the toolpath which is the desired trajectory as closely as possible while the tool moves along the toolpath at the desired velocity.

The deviation of the actual tool trajectory from the desired trajectory as expressed in the toolpath is called machining error. The machining error may be computed as the distance between the instantaneous tool position and the desired trajectory as specified by the toolpath. NC tolerance is defined to be the amount of the permitted machining error while machining. Motion controllers are expected to maintain good or tight NC tolerance. The machining error depends on many factors including the performance of the motion controller and the feedrate selected for traversing the trajectory during machining. In general, higher feedrates will result in larger machining errors.

Conventional part programs do not explicitly address NC tolerance issue and the machine tool operator—part programmer or machinist—must set feedrates to attempt to address this issue. In fact it can not be expressed using conventional NC programming languages, such as EIA RS-274-D, nor do existing motion controllers support the notion of constraining motion so that a NC tolerance specification is met. One of the operator's functions is to select feedrates that would result in acceptable part quality, while simultaneously achieving high metal removal rates. The selection of appropriate feed rates is based on the operator's experience and general rules of thumb may be obtained from numerous handbooks and charts (e.g., Machinery's Handbook, $24^{th}$ edition, Industrial Press Inc., New York 1992). However, the figures from such documents, while perfectly feasible when used under the correct conditions, are frequently inappropriate when applied to specific machining situations. Published figures fail to account for local machining conditions such as sudden changes in the toolpath leaving optimization of the feedrate to the operator. It is difficult for operator to select feedrate values that achieve the desired part quality while maximizing the machine tool's productivity throughout the part program.

SUMMARY OF THE INVENTION

The present invention relates to an apparatus and method of automatically modifying motion control based on acceptable levels of tolerance. The user specifies a desired level of tolerance, and the motion control device calculates the maximum permissible feedrate based on the trajectory, machine, and the desired level of tolerance.

The present invention allows the operator to specify NC tolerance commands along with motion commands for execution by CNC. The NC tolerance commands can be identified using a symbol such as E to distinguish it from conventional symbols such as G, M, F, S, and T when mixed in with conventional part programs or entered separately prior to program execution. The NC tolerance commands specify at what time and in which area the tolerance constraint specified in the command is active. The programmer need not specify feedrate values everywhere. Instead the part program is broken into paragraphs that share the same maximum allowable feedrate. These paragraphs are selected based on considerations such as tool size, material, and machine tool's characteristics variables typically used when determining the feedrate. The machining error need not be taken into consideration when setting the feedrate, as these feedrate adjustments will be automatically taken care of by the control based on the operator's specified error tolerance, or "E code".

The controller will use the programmed information specifying required NC tolerance at this particular instant in time and will examine the active maximum allowable feedrate at that same instant to determine what is a permissible velocity for motion. The controller will execute the toolpath with the programmed maximum allowable feedrate if the NC tolerance condition can be met. Otherwise, the controller will reduce the feedrate to a permissible level so that the NC tolerance condition can be met.

To determine the relationship between feedrate and the NC tolerance, mappings are required that characterize the capabilities of a particular machine tool. The mappings establish the performance of the control on this machine for the various trajectories (e.g. lines, arcs) and transitions amongst these trajectories that the control is likely to encounter. In essence the control determines what maximum permissible feedrate is suitable for the various machining trajectories at different NC tolerance conditions. We refer to this feedrate mapping as the feedrate limitation because exceeding this value will result in excessive machining error, i.e. exceeding the NC tolerance. The feedrate limitation mapping is dependent on the machine, but may be established once for each machine or class of machines through experimentation.

The part program is first processed by the control in several steps to separate the NC tolerance commands from the program. The tolerance constraints specified by the NC tolerance commands may be stored in a table for use by the control. Motion commands are examined and if found to span multiple tolerance constraints are divided into smaller motion command segments such that each segment has a uniform NC tolerance requirement. The segmented motion commands are then processed by the control to select a permissible feedrate according to the limitation mappings, the programmed maximum allowable feedrate and the tolerance constraints stored in the table. Each motion command segment is then executed with modified feedrate and therefore the specified NC tolerance commands should be satisfied. Lastly, feedback from the control is used to tweak on the feedrate if it is found that the machining error is approaching and therefore in danger of exceeding the desired NC tolerance.

Utilizing traditional motion control technology an operator specifies feedrates and hopes the machining error is acceptable but can not guarantee the machining error within a specific range. The present invention provides a system and a method allowing the operator to specify the desired NC tolerance and having the controller automatically compute the feedrate that productivity is as high as possible while maintaining the NC tolerance. Another benefit of this invention is that the operator no longer has to customize a program for each of the various machines in his shop. Instead the customization necessary to maximize the throughput on each machine is done automatically by the motion controller.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1A:
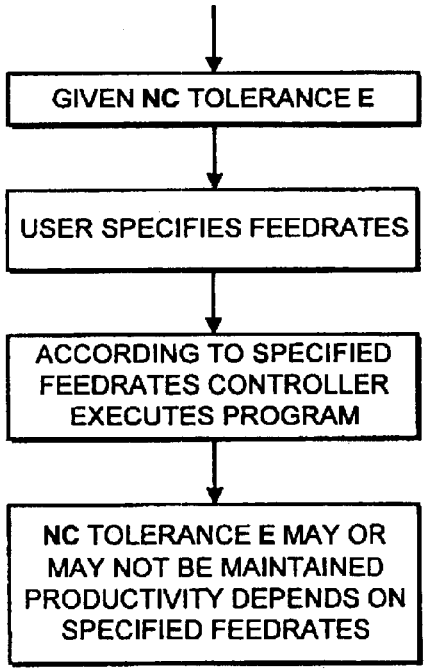
PRIOR ART F I G. 1A
FIGS. 1A and 1B show a flowchart diagram of a traditional machining approach, and the machining approach of the present invention, respectively.
Figure 1B:
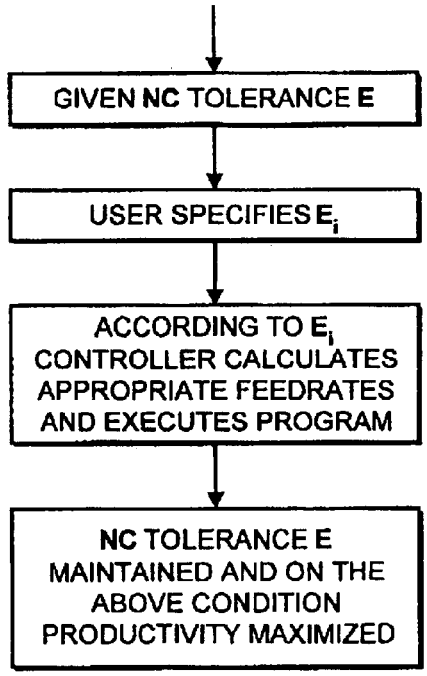

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION OF THE INVENTION

The embodiment disclosed below is not intended to be exhaustive or limit the invention to the precise form disclosed in the following detailed description. Rather, the embodiment is chosen and described so that others skilled in the art may utilize its teachings.

The exemplary embodiment of the present invention utilizes a computer numerically controlled milling machine as the system to which tolerance based motion control technology is applied. At any moment when machining, the tool's position determined from the feedback reported by the position transducers (encoders in the exemplary embodiment) may not coincide with the desired trajectory defined in the tool path of the part program. Generally speaking if the instantaneous tool position is thought of as a point in space and the programmed tool path is assumed to be a curve in space then machining error at any moment in time is the distance from tool's position to the ideal tool path. The NC tolerance is the maximum allowable value of the machining error at a certain time and place, which is represented numerically. Anything which cannot be sensed or measured through feedback, for example the tool deflection or surface finish in the exemplary embodiment, is not of concern in this implementation. Some CAD/CAM/CNC systems approximate an ideal curved tool path using polygons, i.e. straight line segments, to specify the desired trajectory of the tool in space. The deviation between the approximate tool path (polygons) and the ideal trajectory is not the machining error, because where an ideal curved path is unattainable by the machine tool, the polygonal shape is the desired trajectory even if not exactly the ideal shape. Under these circumstances the instantaneous machining error is the distance between the tool position as reported by the encoders and the approximate tool path trajectory (polygons) processed by the controller at any moment.

1. Influences on the Machining Error

The precision by which any motion controller may effect motion along a specified path is determined by numerous variables. Certain variables of a motion controller, such as loop closure rate and the feedback device's resolution, can not be manipulated during machining. The controller can manipulate other variables, for example, variables which help to realize a predetermined or desired tolerance specification. One such variable is the velocity used in traversing the path. Experience has shown that the feedrate or velocity is an important variable in controlling the precision in which a control can traverse a tool path. It has been observed that the manipulation of the feedrate to achieve a given tolerance constraint is often dependent on the specific circumstance in which the controller finds itself at any given instance while traversing the trajectory. These additional variables influence the effect or impact that the feedrate has in controlling the precision of the trajectory manipulation. This section details the variables used in the exemplary embodiment but additional variables exist and may be treated in a fashion similar to that outlined for velocity, curvature, turning angle and rate of deceleration which are described below. The exemplary embodiment assumes that the modeling of each variable's impact on precision is governed by a monotonic function, however other relationships may also exist.

The velocity or feedrate at which a trajectory is traversed influences the magnitude of the machining error. Generally at low feedrates the value of the machining error is small. As the feedrate is increased the magnitude of the machining error also increases. Mathematically the machining error ERR can be expressed as a monotonic function f1 of the feedrate F.

$$ERR \geqq f1(F) \tag{1.1}$$

Therefore we have an inverse relation $$F \leqq g1(ERR) \tag{1.2}$$

In other words, if NC tolerance E is given, a feedrate limitation defining the permissible feedrates at which the NC tolerance will not be exceeded may be calculated via mapping g1:

$$F \leqq g1(E) \tag{1.3}$$

In its simplest form, we may say that $$ERR \geqq c1 \times F \tag{1.4}$$

Where c1 is a constant and therefore we have established the first feedrate limitation as:

$$F \leqq E/c1 \tag{1.5}$$

The curvature of a toolpath also influences the value of the machining error. In the case that the tool path is a curve (e.g., a 3D arc), the machining error can also be expressed as a monotonic function f2 of the tool path's curvature and feedrate. If the feedrate is fixed, then the larger the curvature C (i.e. the smaller the radius) is then the larger the machining error ERR will be. This ay be expressed as:

$$ERR \geqq f2(F, C) \tag{2.1}$$

Therefore another feedrate limitation may be calculated by solving the above inequality for F $$F \leqq g2(ERR, C) \tag{2.2}$$

In other words, if NC tolerance E and curvature C are known, a second feedrate limitation may be calculated via mapping g2:

$$F \leqq g2(E, C) \tag{2.3}$$

For the simplest case we may use $$ERR \geqq c2 \times F \times C \tag{2.4}$$

for some constant c2.

Therefore the second feedrate limitation is $$F \leqq E/(C \times c2) \tag{2.5}$$

The turning angle where two motion commands in the trajectory meet (line-line, line-arc, arc-arc, or arc-line) influences the machining error when the velocity through the turning angle is non-zero. The machining error attributable to this condition may be assumed to be a monotonic function f3 of the feedrate F and the magnitude of the turning angle A.

$$ERR \geqq f3(F, A) \tag{3.1}$$

Therefore a third feedrate limitation may be calculated by solving the above inequality for F giving $$F \leqq g3(ERR, A) \tag{3.2}$$

If NC tolerance E is known, the third feedrate limitation is $$F \leqq g3(E, A) \tag{3.3}$$

For the simplest case, we may use $$ERR \geqq c3 \times F \times A \tag{3.4}$$

for some constant c3.

Therefore the third feedrate limitation is $$F \leqq E/(A \times c3) \tag{3.5}$$

Deceleration also influences the magnitude of the machining error. Assume the control must move the tool along the toolpath trajectory from point Q1 to Q2. Furthermore assume the length of the toolpath segment from Q1 to Q2 is L. Should a feedrate limitation like a sharp turning angle or a large curvature value necessitate that the feedrate at point P2 be a small number F(Q2) then the feedrate at point Q1, F(Q1), has to be restricted in such a manner as to ensure that there is enough time to reduce feedrate from F(Q1) to F(Q2) as the tool traverses the trajectory from point Q1 to point Q2. Given a desirable rate of deceleration, the toolpath segment length L and the feedrate F(Q2), the largest permissible feedrate at point Q1 is a function g4 of L and F(Q2). Therefore a fourth feedrate limitation may be expressed as $$F(Q1) \leqq g4(L, F(Q2)) \tag{4.1}$$

In the simplest case, we may assume accl represents a constant desirable deceleration rate. Then the fourth feedrate limitation can be expressed as $$F(Q1) \leqq \sqrt{(2\times accl)\times(L+(F(Q2)^2)/(2\times accl))} \tag{4.2}$$

The constants c1, c2, c3 in equations (1.4), (1.5), (2.4), (2.5), (3.4) and (3.5) can be determined by conducting a series of experiments on the machine tool in question. It is also possible that automatic calibration equipment may be implemented for each machine tool. These experiments or calibrations consist of recording the machining error along a series of feedrates for each feedrate limitation. Generally speaking, if a selected value for any particular constant results in a failure to meet the NC tolerance requirement due to excessive machining error then the value of the corresponding constant should be increased. If the machining error is much smaller than the NC tolerance requirement then the corresponding constant can be decreased permitting a higher velocity or feedrate to be used when traversing a toolpath trajectory under those trajectory limitation conditions.

In our description of the feedrate limitation conditions it was assumed that the simplest relationship, a monotonic function, adequately defined the feedrate limitation, however other functions may also be used. The use of a function to establish the mapping used by the control in adjusting the feedrate is one method of implementing a control according to the present invention.

Alternately a set of tables may be created specifying the feedrate limitations at specific NC tolerance conditions and machining situations (curvatures, turning angles and decelerations). These tables may be determined through experimentation for a finite set of conditions that may be encountered by the control. Interpolation method can be used to obtain feedrate limitation values based on these tables. The technology of establishing the feedrate limitation tables by experiments and the interpolation technology are standard methods used by computer scientists.

2. Specification of NC Tolerance Conditions.

In the exemplary implementation, a part program consists of sequence of command lines where each line is either a NC tolerance command or a standard ISO or EIA RS-274-D command. Other implementations are also possible.

Though the exemplary embodiment assumes that the desired trajectory of a motion is either a 3D line or a 3D arc with a constant curvature, curves with non-constant curvature, including splines and NURB curves are supported. If a desired trajectory specified by the motion command is complex (e.g., defining a spline curve), the curvature of the trajectory may change drastically along that motion command. Such a motion command is divided into an equivalent collection of new motion commands so that the curvature varies within a predetermined range of values in each new motion command. A new motion command that have non-constant curvature values assume a constant value of C for the curvature in formulas (2.1), (2.2), (2.3), (2.4) and (2.5) where C is selected to be equal to the largest value of the curvature for that new motion command.

The NC tolerance commands specify a region and a tolerance value to be applied to that region along with an identification number that is used as a reference to that NC tolerance command. In an effort to be consistent with the EIA specification's syntax, the NC tolerance command is defined as:

$$E\ tol\ X\ x1\ Y\ y1\ Z\ z1\ X\ x2\ Y\ y2\ Z\ z2\ I\ id \tag{5.1}$$

where capital letters are defined as addresses and lower case letters are used to denote values. The E address identifies this command as a NC tolerance command requesting that the 3D rectangular region defined by the coordinates of the diagonal corners (x1,y1,z1) and (x2,y2,z2) hold the non-zero NC tolerance value of tol. This specific tolerance command is to be identified by the integer value id. Expressed mathematically, the NC tolerance value tol is active when the feedback indicates that motion is occurring in the region bounded by:

$$x1 \leqq x \leqq x2,\ y1 \leqq y \leqq y2,\ z1 \leqq z \leqq z2 \tag{5.2}$$

If an address, X, Y or Z is omitted, the NC tolerance command is interpreted such that the value of the corresponding address is assumed to be arbitrary. For example, $$E0.001\ X0.0\ Y0.0\ X2.0\ Y1.0\ I01 \tag{5.3}$$

specifies that from now on the region bounded by $$0 \leqq x \leqq 2,\ 0 \leqq y \leqq 1 \tag{5.4}$$

requires that the NC tolerance constraint of 0.001 be maintained, regardless of the z coordinate value. If the address I is omitted it is assumed that identification number for this NC tolerance command is 0.

To delete a tolerance command identified by id, the tolerance value for the tolerance command to be deleted must be set to zero as shown in the example below.

$$E\ 0\ I\ 01 \tag{5.5}$$

means that the tolerance command with id 01 is deleted.

3. Selection of the NC Tolerance Constraint

Figure 2:
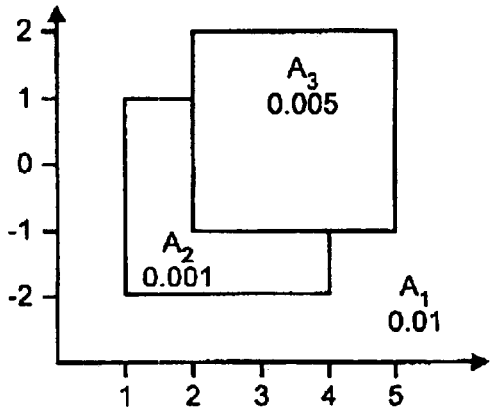
FIG. 2 is an example of NC tolerance commands. The machining area is divided into 3 areas each one has a different requested NC tolerance value.
Figure 3:
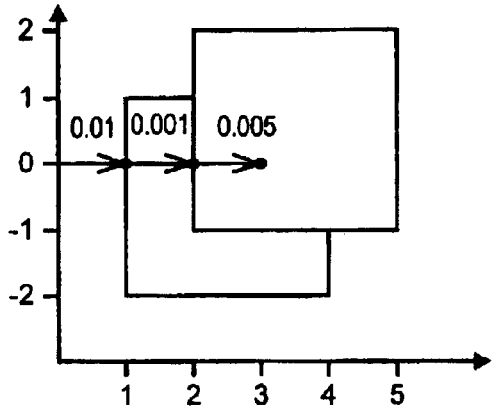
FIG. 3 shows a graph depicting a situation where a motion command is divided into motion command segments each one has a specified tolerance value consistent with the NC tolerance commands.

It should be clear from the fore mentioned description that it is possible to define overlapping tolerance regions. The tolerance-based control must deal with this situation in a consistent manner. One method of rectifying this potentially ambiguous situation is explained below. If we assume P=(x, y, z) is a point in 3D space corresponding to the position of the tool as indicated by the feedback and t0 is the particular time in which a motion command is executed. The point P may belong to a number of the active NC tolerance regions, which have been specified up to time t0. The NC tolerance value at point P at time t0 is defined as the tolerance value specified in the latest NC tolerance command whose region covers the point P. An example is represented in FIG. 2 and FIG. 3. Say there is a linear motion command, moving the tool from point (0,0) to point (3,0), and up to this moment, three NC tolerance commands have been specified. Say they are

E 0.01 I01 (5.6)

E 0.001 X1 Y-2 X4 Y1 I02 (5.7)

E 0.005 X2 Y-1 X5 Y2 I03 (5.8)

Under these conditions the machining space is divided into three areas A1, A2 and A3, with tolerance specified as 0.01, 0.001 and 0.005 respectively. One may assume that the machining space, which has been divided into tolerance regions, is like a computer screen with overlapping windows as is indicated by FIG. 2.

In order that the tolerance based motion controller effects linear motion from point (0,0) to point (3,0) we see that motion will be bounded by three separate NC tolerance constraints. Therefore the linear move command may be partitioned into three segments: from point (0,0) to point (1,0) where the specified NC tolerance is 0.01; from point (1,0) to point (2,0) where the specified NC tolerance is 0.001; from point (2,0) to point (3,0) where the specified NC tolerance is 0.005. (See FIG. 3)

Though this implementation allows for the construction of complex tolerance constraints most typical NC part programming applications utilize simple tolerating constraints. Typically a single tolerance constraint is specified for the roughing phase. In roughing, the objective is to quickly remove material from the workpiece as it is brought within the approximate dimensions of the desired component and a separate tighter tolerance constraint is often applied to the finishing cut which is designed to bring the component to its final dimensions. For example a NC tolerance command E 0.01 may be inserted at the beginning of the roughing phase and a NC tolerance command E 0.0005 may be inserted at the beginning of the finishing phase.

It should be noted that on any machine tool, there is an absolute physical tolerance limitation, i.e. regardless of how low the feedrate is, the limitations of the system prevent it from holding an NC tolerance below a certain value. A check is made to determine whether any specified NC tolerance command exceeds the system's capability. If such a condition is encountered the user is informed and provided the opportunity to change the tolerance specification. If he fails to select an achievable value the system automatically converts these unattainable tolerance specification to equal the absolute physical tolerance limitation of the system.

4. Real Time NC Tolerance Based Control.

Figure 9:
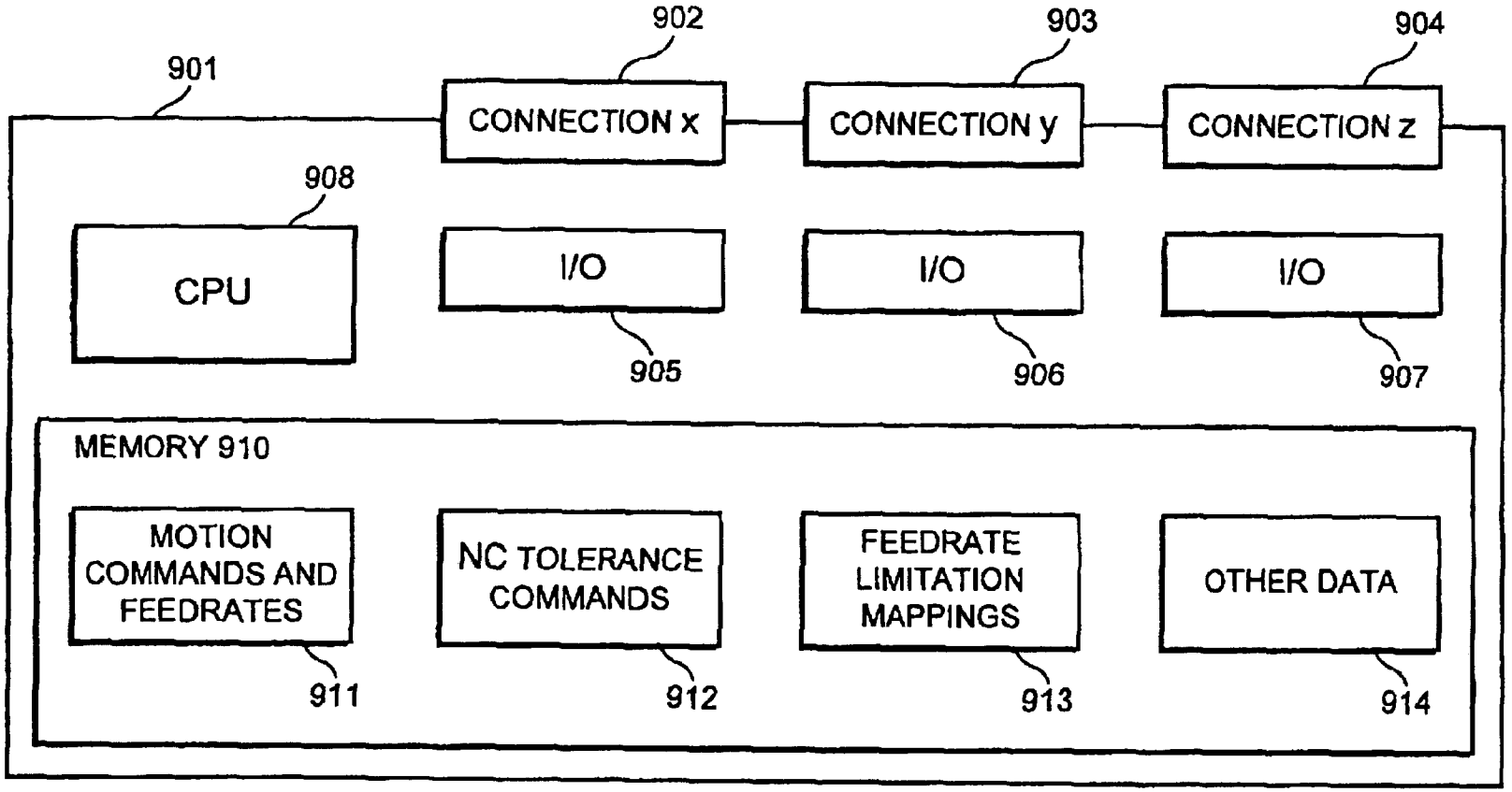
FIG. 9 is a schematic diagram of a controller that may be employed in realizing the present invention.

FIG. 9 is a schematic diagram of a controller that may be used in realizing the present invention, which may take the form of a typical controller card. As is typical of most motion control cards the controller card 901, includes connectors 902, 903 and 904 for physically connecting the controller card to machine tool in order to facilitate communications, i.e. sending electronic signals to and receiving electronic signals from, with the machine tool. Three connectors are depicted on the controller card, one for each controlled axis of motion, but other configurations are also available. The communication signals exchanged between the controller card and the machine tool must often be converted into the appropriate format, for example some motors use an analog voltage input signal between −10 volts and +10 volts to determine at what rate the motors should turn.

Most digital computers, like Intel Pentium Based PC, do not support analog voltages, but utilize groups of bits (ones and zeros) represented by discrete voltage levels (+5 volts and 0 volts) to represent values. Thus if a PC based motion control card desired to spin a motor in the clockwise direction at its maximum speed (+10 volts in our example) the collection of bits representing this request would have to be converted to the +10 volt signal understood by the motor. This conversion of signals for communication purposes is standard in the industry and often performed by the input/output, I/O, module of the controller card. In FIG. 9, one I/O module (905, 906 and 907) is depicted for each controlled axis.

Some control cards incorporate a CPU 908 and on board memory 910 for the execution of programs and control algorithms. The PMAC offered by Delta Tau and the DMC-1700 by Galil Motion Control, Inc. of Mountain View, Calif. is typical of cards incorporating a CPU and memory. Other cards such as the servo transducer 5-axis PCB Assembly (part no. 415-0622-001), offered by Hurco Companies, Inc. of Indianapolis, Inc., is used in the exemplary embodiment; and this servo transducer does not have an on board CPU and memory but utilizes the CPU and memory of the computer to which they are plugged into for these services. The difference between these two configurations is primarily one of cost and of little consequence to a programmer implementing the tolerance based control technology of this invention. The integration of these components and the method by which control algorithms are stored and executed by the CPU is well understood in the art. The details of this process have been omitted for the sake of brevity. To simplify the explanation of the invention, FIG. 9 shows CPU 908 and memory 910 physically integrated on the motion control card.

In the exemplary embodiment we have assumed that a multi-tasking operating system (OS), like Windows95 offered by the Microsoft Corporation of Redmond Washington, is employed for running the algorithms implementing this invention. A real-time OS, like VRTX offered by Ready Systems of Sunnyvale, Calif. could also be used improving the run time performance of the algorithms as well. The decision of what operating system to use and whether or not to employ multi-tasking paradigm depends on the application at hand and is a decision routinely made by those skilled in the art of computer system programming and design. Contained in the memory 910 is a data area for storage of values relevant to the task at hand (911, motion command and permitted feedrates; 912, NC tolerance commands; 913, feedrate limitation mappings; 914, other data), as is commonly employed by people skilled in the art of programming.

Figure 4:
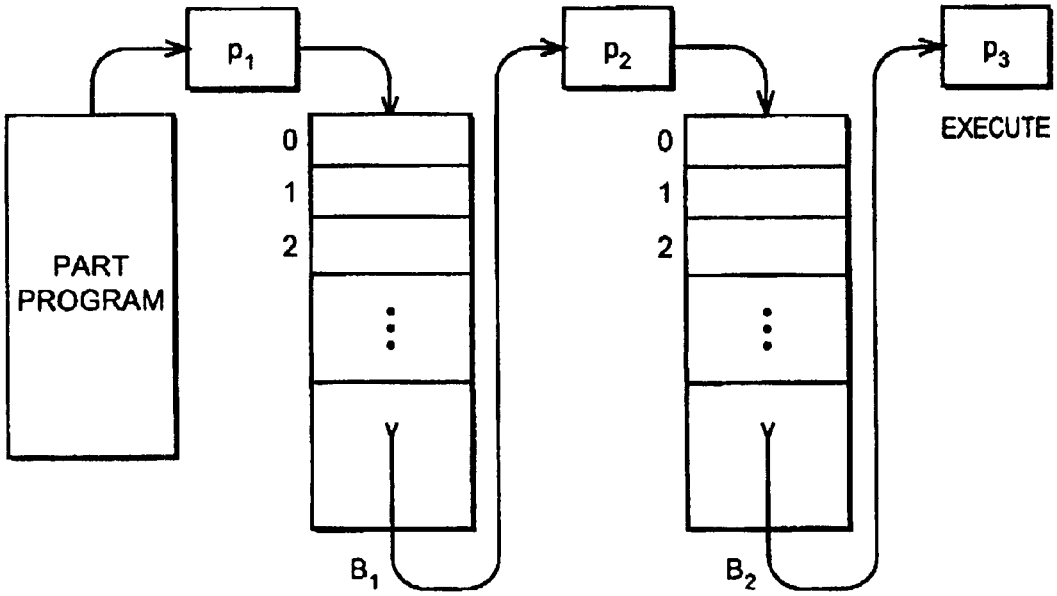
FIG. 4 shows a graph depicting the processes of tolerance based machining.

Three tasks employed in realizing the current invention labeled P1 (the parser-interpreter), P2 (the adjuster) and P3 (the surety executer) operate in a pipeline fashion. Utilizing a division of labor these tasks implement the invention by performing a specific task on the input, the tool path program, and passing the results of its effort to the next task for manipulation. Communication amongst these cooperating tasks is achieved using two buffers, B1 for communication from the parser-interpreter to the adjuster and B2 for communication from the adjuster to the surety executer. These communication buffers stored in the data region are referenced in FIG. 4.

Task P1 (the parser-interpreter) is responsible for manipulating the part program passed to the controller to separate and interpret tolerance commands and partition the trajectory in a convenient fashion for processing by subsequent tasks. The details of this manipulation will become apparent as the invention is detailed. The adjuster, task P2, takes the output from the parser-interpreter, i.e. modified part program, and sets the permissible feedrate for each segment of the part program to a suggested value that it assumes will meet all of the programmed constraints, i.e. tolerance and maximum allowable feedrate. The output results of this manipulation are used as input by the surety executer to effect motion of the motors and monitor the progress of the motion such that the desired NC-tolerance constraints are not violated. If feedback from the machine tool indicates that a violation of any of the constraints is imminent corrective action is immediately taken by the surety executer to prevent the violation from occurring. Each of these tasks manipulates their respective inputs concurrently, however they are co-dependant in that the output for one process is the input for the next. This results in the sequential execution of the part program.

Conceptually, a FIFO (first in first out) buffer can be viewed as a queue where elements are inserted at one end and removed at the other end. When a new element is pushed in, it occupies position 0 in the buffer, the element originally placed in position 0 will be pushed down to position 1, the element originally placed in position 1 will be pushed down to position 2, and so on. The length of the queue is then increased by 1. When an element is popped out, it is always the element that occupies the last position and it is simply removed from the buffer without affecting the positions of other elements in the buffer. The length of the queue is then decreased by 1. It is a standard technology to efficiently implement FIFO buffer without actually moving its elements down. See "Data structures and algorithms", Alfred V. Aho, John E. Hopcroft, Jeffrey D. Ullman.

Dealing with each of the tasks in turn one may understand this invention. The input to the parser-interpreter task is a part program with NC tolerance commands and motion commands mixed in. P1 reads in the part program one line at a time separating and interprets the NC tolerance command as they are encountered. The parser-interpreter also divided a motion command, if necessary, into a number of motion command segments such that the NC tolerance for each motion command segment is of a uniform value, yielding an equivalent part program to the one read in as input. Each motion command segment has six attributes associated with it. Four of which can be determined and assigned at this point in time by the parser-intexpreter. These attributes are identified as:

g: the desired trajectory (the geometry, either a line or an arc segment);

l: length of the segment;

u: programmed maximum allowable feedrate; and t: required NC tolerance.

The remaining two attributes:

v: feedrate limitation at an arbitrary point on the desired trajectory, and w: feedrate limitation at the end of the desired trajectory. are unknowns at this point in time having no value assigned to them.

The communication buffers B1 and B2 used to communicate between tasks consist of motion command segments with their associated attributes. The notations Bj[i].g, Bj[i].l, Bj[i].t, Bj[i].u, Bj[i].v, Bj[i].w are used to denote the attributes g, l, t, u, v, and w in buffer Bj (j=1,2) in position i, respectively.

Task P1 then pushes each motion command segment with its attributes into buffer B1 maintaining the same order as the original part program.

Task P2, the adjuster, removes or pops the next available motion command segment from buffer B1 calculates its feedrate limitations according to the NC tolerance attribute t of the segment and other conditions such as curvature and turning angle. These limitations are assigned to the attribute values v and w for the feedrate limitation along an arbitrary point of that segment and at the endpoint of that segment respectively. The adjuster task P2 then pushes the motion command segment into the second buffer B2. Continuing its processing the adjuster then performs a look-ahead computation to further limit the feedrate of commands it has already placed in the buffer. This look-ahead computation uses the information stored in the attributes v and w and deceleration limitations as will be detailed shortly.

The third task (the surety executer) P3 pops a motion command segment from B2 and drives the milling machine along the desired trajectory of this motion command segment. The velocity used in executing this command is computed according to the current machining condition as reported by the machine tool feedback and the values contained in the attributes u, v, and w so that the required NC tolerance can be achieved. Once the surety-executor P3 has a motion command segments it executes as a cycle repeatedly reading machine tool's position, determining the appropriate velocity at which to turn the motors and issuing control signals to the motors until the end point of the motion command segment is reached. Once the endpoint is reached the next command is popped from the buffer B2 until no more commands are found signaling the program's execution has been completed. Task P3 needs to run as frequent as possible. In our implementation, the time interval between two running cycles of P3 is less than 8 mini seconds.

Figure 5:
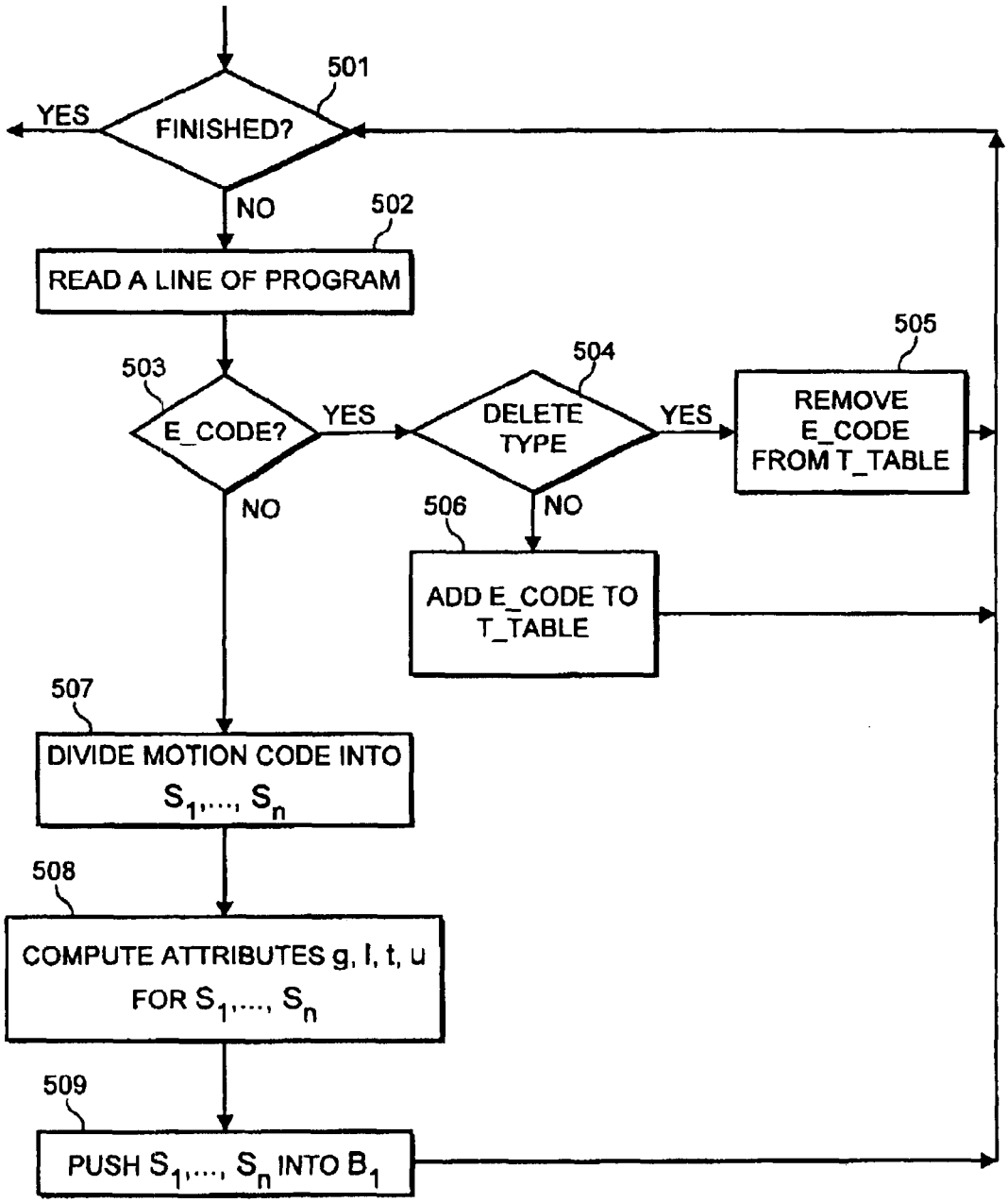
FIG. 5 is a flowchart showing the processing of the parser-interpreter process P1 of the present invention.

The NC tolerance commands interpreted by P1 are represented by values stored in a table identified as T_table. FIG. 5 shows how process P1 reads in the part program, processes the NC tolerance commands, divides the motion commands into motion command segments and pushes them into a FIFO buffer B1.

At decision box 501, it checks whether the whole part program has been processed. If yes, then it is done. Otherwise, control goes to box 502 to read a line of the part program. Then control goes to decision box 503, to check the type of the current line. If the current line is a E code (NC tolerance command), control goes to decision box 504, to check whether it is a delete type NC tolerance command. If yes, the command must have a form:

$$E\ 0\ 1xx \tag{5.9}$$

where xx is the ID number, then control goes to box 505, where the E code (NC tolerance command) stored in the T_table with ID numbered xx is deleted. (Search from the top of the table to see if any E code has an identification numbered as xx. If there is one then delete it from the T_table and shift E codes below it one position up). Otherwise if at decision box 504 the current line is an ordinary E code, control goes to box 506, where this new E code is added to the end of the T_table. If at decision box 503, the type of current line is not a E code, i.e., is a motion command, then control goes to box 507, where the motion command is divided into one or more motion command segments S1, S2, . . . , Sn, each one has a uniform tolerance value, according to the current tolerance requirement represented by the T_table. Then control goes to box 508, where the attributes g, l, t, u are computed and assigned for each segment. Then control goes to box 509 where the motion command segments S1, S2, . . . , Sn are pushed into buffer B1. After box 505, box 506 or box 509, control goes back to box 501.

The function of box 507 is further described as follows. Say S is a connected sequence of motion command segments, each is marked as either clipped or unclipped. R is a rectangle area. We define an operation CLIP(S, R) as follows: 1. If a motion command segment in S is marked clipped, then keep it unchanged; 2. If a motion command segment in S is marked unclipped, then find all intersection points with the boundaries of the rectangular area R and divide the segment by these points into sub segments. Mark all sub segments inside R clipped and mark all sub segments outside R unclipped. Therefore after CLIP(S, R), the sequence S may be divided into more segments. There is a standard way to implement CLIP(S, R). See Michael Abrash, "3-D Clipping and Other Thoughts", Dr. Dobb's Sourcebook, March/April 1996, #256 Ramblings In Real Time, pp. 43–50.

In box 507, originally S is a single motion command segment marked as unclipped (the ordinary motion command read at box 502 and passed from box 503). Say at this moment, there are n NC tolerance commands T1, T2, . . . , Tn in the T_table. Their rectangular areas are R1, R2, . . . , Rn respectively. Then the operation can be implemented as $$\text{From } j=n \text{ to } j=l \text{ do CLIP}(S, Rj) \tag{6.1}$$

The operation of adding a NC tolerance command into T_table, operation of deleting a NC tolerance command from the T_table and the operation of pushing a motion command segment into a buffer are all standard for an average level programmer. See "Data structures and algorithms", Alfred V. Abo, John E. Hopcroft, Jeffrey D. Ullman. The attributes g, l, t, and u can be either directly copied from the original motion commands, or calculated from the motion command segments obtained from the original motion commands.

Figure 6:
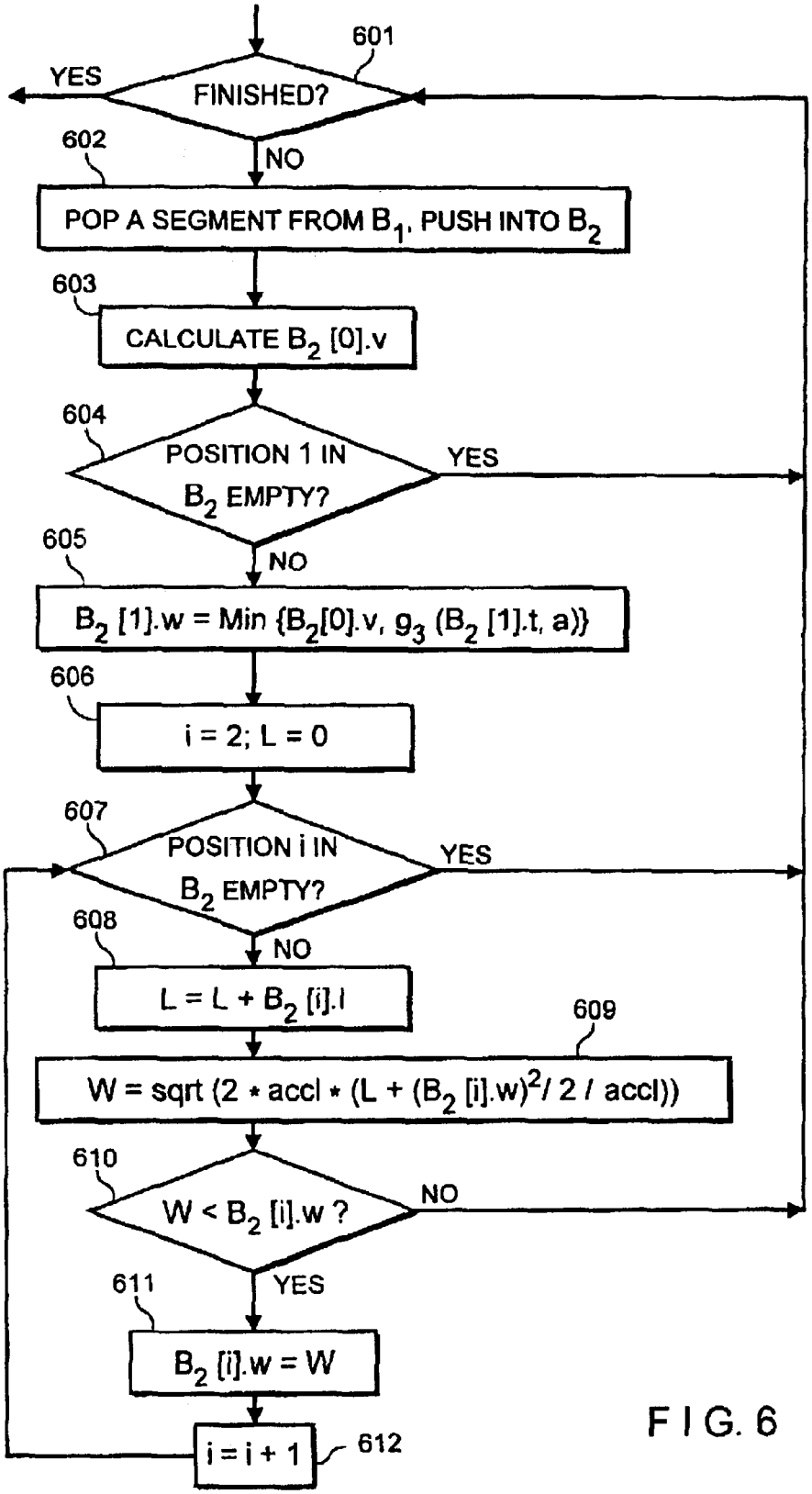
FIG. 6 is a flowchart showing the processing of the adjuster process P2 of the present invention.

The second task P2 will pop a motion command segment from buffer B1 and push it into another FIFO buffer B2, calculate and attach the attributes u and w to each segment as shown in FIG. 6.

At decision box 601, the process P2 checks whether Buffer B1 is empty. If it is, it is done and quits processing. Otherwise, control goes to box 602, where a new motion command segment is popped from buffer B1 and pushed into buffer B2. That means the new motion command segment's current position in buffer B2 is 0, and all other motion command segments in B2 sink down one position. At box 603, the attribute v in position 0 is calculated as follows. If the trajectory of motion command segment in position 0 is a straight line, then attribute in position 0 is determined by:

$$B2[0].v=g1(B2[0].t) \tag{7.1}$$

Figure 7:
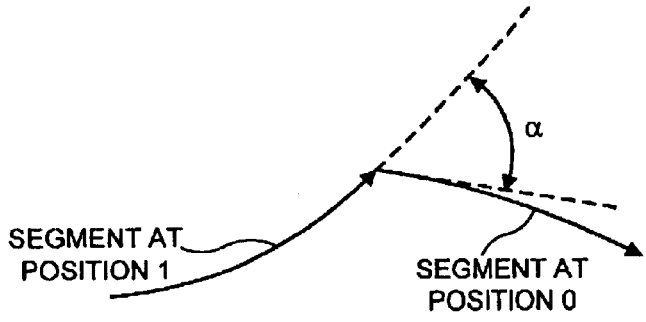
FIG. 7 is a geometric depiction of a tuning angle.

If the trajectory of the motion command segment in position 0 is an arc, then v is determined by:

$$B2[0].v=\text{Min}\{g1(B2[0].t),g2(B2[0].t, c)\} \tag{7.2}$$

where c is the curvature of the arc in position 0. Min{a,b} means the smaller one of a and b. Then control goes to decision box 604 to check whether position 1 in B2 is empty. If it is empty in position 1, then control goes back to decision box 601. Otherwise, control goes to box 605 to calculate attribute w in position 1 as follows:

$$B2[1].w=\text{Min}\{B2[0].v,g3(B2[1].t, a)\} \tag{7.3}$$

where a is the turning angle at the end point of trajectory in position 1, which can be determined by the desired trajectories of segments in positions 0 and 1. See FIG. 7.

If at the end of segment in position i the feedrate B2[i].w is high, at the end of segment in position 1 the feedrate B2[1].w is low, and the total length Li of the tool path segment from the end point of segment in position i to the end point of segment in position 1 is short, then it may not have enough time to decelerate. Therefore we need to put a limit on B2[i].w based on B2[1].w and Li by:

$$B2[i].w \leqq \sqrt{(2\times accl)\times(Li+(B2[1].w^2)/(2\times accl))} \tag{7.4}$$

After box 605 control goes directly to box 606, where a counter i is set to 2 and L is initialized to 0. Then control goes to decision box 607 to check whether position i in B2 is empty. If it is empty, the look-ahead is finished then control goes back to box 601. Otherwise, control goes to box 608, where the length of segment in position i is added to L. Therefore L is the distance form the end point of segment in position i to the end point of segment in position 1. Then control goes to box 609, where the feedrate limitation is calculated as:

$$W=\sqrt{(2\times accl)\times(L+(B2[1].w^2)/(2\times accl))} \tag{7.5}$$

At decision box 610, the current end point feedrate limit B2[i].w is compared with W. If B2[1].w is larger, then control goes to box 611, where B2[i].w is replaced by W and control further goes to Box 612, where the counter i is increased by 1 and control goes to box 607. Otherwise at decision box 610, B2[i].w is smaller than W, the look-ahead is finished for segment in position 1 and therefore control goes back to box 601.

Figure 8:
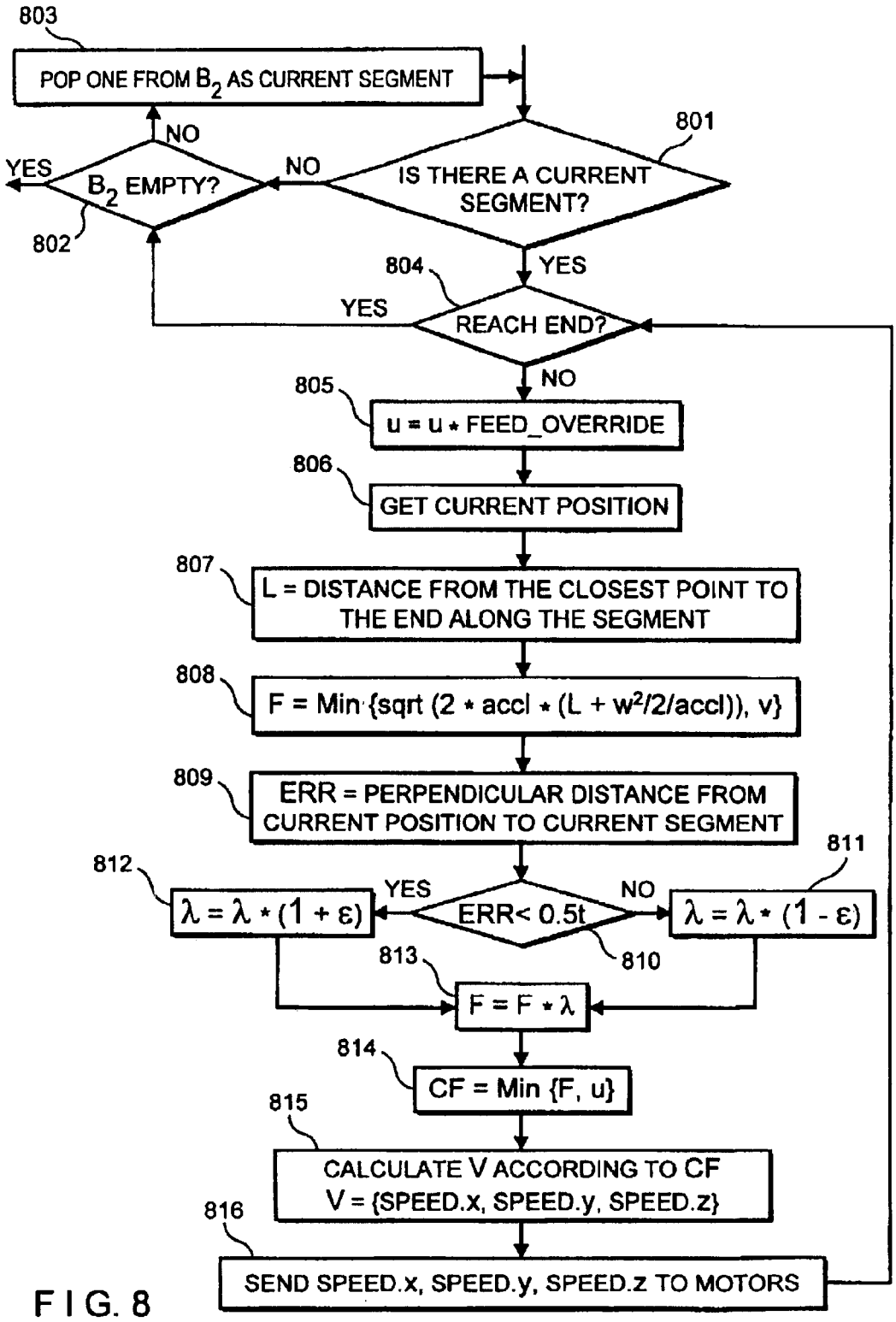
FIG. 8 is a flowchart showing the processing of executer process P3 of the present invention.

There is a third process P3 that takes motion command segments from buffer B2 and executes them sequentially (FIG. 8). At decision box 801, it checks whether there is a current motion command segment. At the very beginning there is no current motion command segment, but after P3 popped a motion command segment there will be a current motion command segment. If there is no current motion command segment, control goes to decision box 802 to check whether B2 is empty. If it is empty, the process P3 quits. Otherwise, control goes to box 803, where a motion command segment together with all its attributes is popped from buffer B2 and used as the current motion command segment being executed and control goes back to box 801. If at decision box 801 it finds there is a current motion command segment then control goes to decision box 804. Decision box 804 checks whether the tool has reached the end point of desired trajectory of the current motion command segment within specified NC tolerance (attribute t of the current motion command segment). If yes, control goes back to box 802. Otherwise, control goes to box 805 where the programmed feedrate, which is represented by attribute u in the current motion command segment, is modified by multiplying it by the feed-override factor. (The feed-override factor is usually set at 100%, no-change in velocity, but can be changed by an operator at machining time. This factor allows the operator to either increase or decrease the feedrate of an executing program by a given percentage while the part program is running. This type of interactive control is commonly supported by motion controllers and incorporated within our discussion to show how it can be supported by the current invention). At box 806, the current tool position is read from encoders. At box 807 the length from the point, which is on the desired trajectory of the current motion command segment and closest to the current tool position, to the end point of the current motion command segment is calculated as L. At box 808, the feedrate limitation is calculated as:

$$F=\mathrm{Min}\{\sqrt{(2\times accl)\times(L+w^2/(2\times accl))},\ v\} \quad (7.6)$$

where w and v are the corresponding attributes of the current motion command.

At box 809, the machining error ERR is calculated, which is the perpendicular distance from the tool position to the current segment (in our current implementation it is a straight line or an arc in 3D space). The calculation is standard and may be found in any elementary geometry text. Then control goes to decision box 810, where the machining error is compared with one half of the NC tolerance specified, the attribute t of the current segment.

Between box 810 and Box 813, a dynamic feedrate adjustment is implemented. If ERR is close to the NC tolerance specified (not smaller than 50 percent of the NC tolerance), then control goes to box 811. In box 811, a parameter identified as lambda, whose initial value is 1, is decreased a little bit by multiplying a number 1-epsilon, which is slightly smaller than 1 (such as 0.999). Otherwise, control goes to box 812 and lambda is increased a little bit by multiplying a number 1+epsilon, which is slightly larger than 1 (such as 1.001). From box 811 or box 812, control goes to box 813, where the feedrate is multiplied by lambda. Therefore if the machining error is close to the requested NC tolerance, the feedrate may further decreased so that the requested NC tolerance may not be exceeded.

At box 814, the smaller of the modified programmed feedrate u obtained at Box 805 and the feedrate limitation F will be chosen as the control feedrate CF. At box 815, according to the control feedrate CF, speed signals that will send to motors on all axes of the milling machine are calculated. We represent these signals by using a vector:

$$V=(speed.x,\ speed.y,\ speed.z) \quad (7.7)$$

where speed.x, speed.y and speed.z are speed signals that are used to control motors on X, Y, and Z axis respectively. Then control goes to box 816, where speed signals speed.x, speed.y and speed.z are sent to motors on X, Y, and Z axes respectively to move the milling machine. Then control goes back to box 804.

There are many different ways of calculating these speed signals, typically a traditional PID loop or alternatively using the PathFree control technology developed by CIMplus Inc. as disclosed in the copending U.S. patent application Ser. No. 08/300,631, entitled REAL-TIME OPERATING SYSTEM AND METHOD FOR INTERACTIVE OPERATION OF A PROGRAMMABLE MACHINE, filed on Sep. 2, 1994, the disclosure of which is explicitly incorporated by reference. However, the exact method of calculating the speed signals is not the subject of the present invention.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

I claim:

1. A method of NC tolerance based motion control *for a motion device based on feedrate parameters* comprising the steps of:

specifying [where and when what NC tolerance is requested by using NC tolerance commands] *for a desired trajectory a plurality of NC tolerances from the desired trajectory*;

[obtaining the] *generating* motion commands, [including its] *based on the* desired trajectory and *the* feedrate *parameters*;

calculating feedrate limitations by mappings from [desired trajectory of] *said* motion commands and *at least a first* NC tolerance [requirement commands] *from the desired trajectory*;

[modifying the] *determining a* commanded feedrate by using [the] *said* feedrate limitations; *and*

[executing the] *moving said motion device based on said* motion commands [according to modified] *and said commanded* feedrate [so that the requested], *whereby the at least a first* NC tolerance [may be] *from the desired trajectory is* satisfied *by moving said motion device based on said motion commands and said commanded feedrate*.

2. An apparatus for *performing* NC tolerance based motion control for a machine tool [using], *said apparatus having access to* a part program [and a desired error tolerance], *said apparatus* comprising:

[parsing means for parsing] *a parser adapted to parse* the part program into at least one segment, each *said* segment including *an associated* trajectory and *an* error tolerance [information] *range from the associated trajectory*;

[calculating means for determining] *a processor adapted to determine* a modified feedrate value for each *said* segment based on the associated trajectory and *the* error tolerance [information] *range from the associated trajectory, the modified feedrate value being based at least in part on a predicted deviation of the motion device from the associated trajectory*; and

[executing means for operating] *a control configured to provide signals to operate* the machine tool according to *said* modified feedrate value [so that the desired] *for each said segment, whereby the* error tolerance [may be] *range from the associated trajectory is* satisfied *by operating the machine tool according to said modified feedrate*.

[3. A method of NC tolerance based motion control comprising the steps of:

specifying where and when what NC tolerance is requested by using NC tolerance commands;

obtaining the motion commands, including its desired trajectory and feedrate;

calculating feedrate limitations by mappings from desired trajectory of motion commands and NC tolerance requirement commands;

modifying the commanded feedrate by using the feedrate limitations;

executing the motion commands according to modified feedrate so that the requested NC tolerance may be satisfied.]

4. An NC motion control system capable of processing NC tolerance requirements and motion commands with associated feedrates *for a motion device* and modifying feedrates according to [the] *a* desired trajectory of the motion [command] *commands* and *said* NC tolerance [commands so that the NC tolerance] requirements [may be satisfied], *said system* comprising:

*a* motion command [means] *unit adapted* to store a set of *said* motion commands, including [related] *said associated* feedrates;

*a* tolerance command [means] *unit adapted* to store a set of NC tolerance commands specifying where and when an NC tolerance *range* is requested;

*a* feedrate [mappings means] *mapper adapted* to calculate a set of feedrate [limitation mappings that map] *limitations mapped from* the desired trajectory of *said* motion commands and *said* NC tolerance commands to [the feedrate limitations that allows the motion command to be executed within the] *maintain a position of the motion device within a* specified NC tolerance *range from the desired trajectory*;

a processor [capable of modifying] *configured to modify* the [feedrate in the motion commands] *associated feedrates of the motion device* based on the *set of* feedrate [limitation mappings, the motion command to be executed and the NC tolerance requirement for the said motion command, capable of reading position feedback signals, and capable of calculating motion signals according to the said motion command, the position feedback and the modified feedrate] *limitations and to move the motion device based on the modified associated feedrates*.

5. A method of *operating a* tolerance based computer-controlled machine tool Numerical Controller (NC) *to control the operation of a motion device, said method* comprising the steps of:

[having the operator specify the intended] *specifying a desired* NC tolerance level and generating NC tolerance commands therefrom;

[obtaining] *specifying* a set of motion commands, [the motion commands] including *a* desired trajectory and feedrate;

[in a computer,] calculating feedrate limitations by mappings from [the] *said* desired trajectory [of motion commands and the] *and said* NC tolerance [requirement] commands;

modifying [the set of feedrate] *said motion* commands based [upon] *on said* feedrate limitations; and executing [the] *said* motion commands, according to [the set of] *said* modified feedrate commands[, so that the NC tolerance may be reduced to the intended level; thereby improving the control quality] *to move of the motion device, whereby the motion device is maintained within the NC tolerance level as the motion device is moved*.

6. The method [described in] *of* claim 5 wherein the NC tolerance commands are in the form of specialized G and M codes.

*7. The method of claim 1, wherein each of the plurality of NC tolerances is a dimensional tolerance.*

*8. The method of claim 1, wherein the motion device is a machine tool.*

*9. The apparatus of claim 2, wherein the error tolerance range is a dimensional tolerance range.*

*10. The method of claim 4, wherein the motion device is a machine tool.*

*11. The method of claim 5, wherein the NC tolerance level is a dimensional tolerance level.*

*12. A method of operating a motion controller for controlling a motion device within an acceptable deviation range from a desired trajectory, the acceptable deviation range from the desired trajectory being non-uniform, the method comprising:*

*determining a first uniform acceptable deviation range corresponding to a first desired trajectory segment of the desired trajectory for the motion device;*

*obtaining a first velocity for the motion device;*

*determining a maximum velocity for the motion device based on said first uniform acceptable deviation range from the first desired trajectory segment, the maximum velocity being greater than the first velocity; and*

*operating the motion controller based on said determined maximum velocity to influence a movement of the motion device at a second velocity greater than the first velocity, whereby the movement of the motion device is maintained within the first acceptable deviation range from the first desired trajectory segment.*

*13. The method of claim 12, wherein said first uniform acceptable deviation range is specified by a user.*

*14. The method of claim 12, further comprising the step of:*

*determining a predicted deviation of said motion device from the first desired trajectory segment, wherein said maximum velocity is further based on said predicted deviation.*

*15. The method of claim 14, wherein said first desired trajectory segment is specified by a user.*

*16. The method of claim 14, wherein said first desired trajectory segment is calculated.*

*17. The method of claim 14, wherein said predicted deviation is based on prior performance of said motion device.*

*18. The method of claim 14, wherein said predicted deviation is based on experimentation.*

*19. The method of claim 12, wherein said second velocity is based in part on real-time monitoring of a performance of said motion device.*

*20. The method of claim 19, wherein the performance of said motion device includes a current position of the motion device.*

*21. The method of claim 12, wherein said acceptable deviation range from the desired trajectory includes a plurality of uniform acceptable deviation values corresponding to a plurality of trajectory segments of said desired trajectory.*

*22. The method of claim 12, wherein the first uniform acceptable deviation range is a dimensional deviation range and the velocity is the maximum velocity.*

*23. The method of claim 12, wherein the motion device is a machine tool.*

*24. A method of controlling a machine tool with a controller, said method comprising:*

*selecting an operation for the machine tool;*

*associating a first feedrate and an acceptable deviation range from a desired trajectory with said operation;*

*determining a maximum machine tool feedrate for said operation based on said acceptable deviation range from the desired trajectory; and*

*providing control signals to move the machine tool at a second feedrate being greater than the first feedrate, the maximum machine tool feedrate being greater than the first feedrate, whereby the maximum machine tool*

*feedrate is determined to maintain the machine tool within the acceptable deviation range from the desired trajectory.*

*25. The method of claim 24, wherein said acceptable deviation range from the desired trajectory includes a plurality of values corresponding to a plurality of segments of said desired trajectory.*

*26. The method of claim 24, wherein said operation is characterized by at least one of the first velocity, the desired trajectory, a curvature of the desired trajectory, a turning angle of the desired trajectory, an acceleration, and a deceleration.*

*27. The method of claim 24, further comprising the step of determining a predicted deviation of the machine tool from the desired trajectory for said operation and wherein said maximum machine tool feedrate is further based on said predicted deviation of the machine tool from the desired trajectory.*

*28. The method of claim 27, wherein said step of determining said predicted deviation of the machine tool from the desired trajectory includes measuring previous machine tool performance.*

*29. The method of claim 27, wherein said predicted deviation of the machine tool from the desired trajectory is based on at least one of a function and a data set based on at least one of the first velocity, the desired trajectory, a curvature of the desired trajectory, a turning angle of the desired trajectory, an acceleration, and a deceleration.*

*30. The method of claim 24, wherein said determining step occurs in real-time while said controller controls said machine tool.*

*31. The method of claim 24, wherein said acceptable deviation range from the desired trajectory is at least one of a dimensional deviation and a geometric deviation.*

*32. The method of claim 24, wherein the acceptable deviation range is a dimensional deviation range.*

*33. The method of claim 24, wherein said determining step includes the step of monitoring a current position of the machine tool and the second feedrate is further based on a current deviation of the machine tool from the desired trajectory.*

*34. A method of operating a motion control device to control the movement of a motion device within an acceptable deviation range, the motion control device having at least one variable parameter, the method comprising the steps of:*

*obtaining a motion profile for the motion device;*

*associating the acceptable deviation range with said motion profile;*

*determining a predicted deviation of the motion device from said motion profile;*

*determining a value for the at least one variable parameter based on said predicted deviation of the motion device from said motion profile and said acceptable deviation range associated with said motion profile, the value of the at least one variable parameter to maintain the motion device within the acceptable deviation range associated with said motion profile; and*

*providing control signals to move the motion device based on the value for the at least one variable parameter.*

*35. The method of claim 34, wherein said at least one variable parameter includes at least one velocity parameter.*

*36. The method of claim 34, wherein said acceptable deviation range associated with said motion profile includes a plurality of values corresponding to a plurality of segments of said motion profile.*

*37. The method of claim 34, wherein the value of the at least one variable parameter minimizes the time required to traverse said motion profile within said acceptable deviation range associated with said motion profile.*

*38. The method of claim 34, further comprising the step of monitoring a current position of the motion device, wherein said predicted deviation of the motion device from said motion profile is determined based in part on the current position of the motion device.*

*39. The method of claim 34, wherein the acceptable deviation range is a dimensional deviation range.*

*40. The method of claim 34, wherein the motion device is a machine tool.*

*41. The method of claim 34, wherein the at least one variable parameter includes a first velocity parameter corresponding to a first direction of travel of the motion device, a second velocity parameter corresponding to a second direction of travel of the motion device, and a third velocity parameter corresponding to a third direction of travel of the motion device.*

*42. The method of claim 34, wherein the motion profile is provided in a part program.*

*43. The method of claim 42, wherein the part program further includes information about the acceptable deviation range.*

*44. The method of claim 34, wherein the step of associating the acceptable deviation range with said motion profile includes the steps of:*

*parsing the motion profile into a plurality of segments based on the acceptable deviation range, the acceptable deviation range having a plurality of values and each segment having a constant value for that segment; and*

*storing the plurality of segments and associated constant value acceptable deviation ranges on a computer readable medium.*

*45. An apparatus for control of a motion device capable of movement according to a desired motion, the apparatus comprising:*

*a processor adapted to receive data relating to said desired motion, a first acceptable deviation for said desired motion associated with a first 3D region of space, and a second acceptable deviation for said desired motion associated with a second 3D region of space, said processor further adapted to determine a control signal including a first motion device velocity information based on the first acceptable deviation for a first portion of said desired motion in the first 3D region of space and based on a first predicted deviation of the motion device from the first portion of the desired motion and a second motion device velocity information based on the second acceptable deviation for a second portion of said desired motion in the second 3D region of space and based on a second predicted deviation of the motion device from the second portion of the desired motion; and*

*a device coupled to said processor and configured to provide said control signal to the motion device.*

*46. The apparatus of claim 45, wherein said first motion device velocity information corresponds to a maximum velocity of the motion device while maintaining the motion device within the first acceptable deviation for the first portion of the desired motion.*

*47. The apparatus of claim 45, wherein the motion device includes a machine tool.*

*48. The apparatus of claim 45, wherein the data related to the desired motion is based on a part definition which*

*specifies the first specified velocity, wherein the velocity of the motion device is maximized.*

*49. The apparatus of claim 45, wherein the acceptable deviation range is a dimensional deviation range.*

*50. An apparatus for control of a motion device capable of movement according to a desired motion, the apparatus comprising:*

*a processor adapted to receive data relating to said desired motion and an acceptable deviation range for said desired motion passing through a first 3D region, said processor further adapted to determine a control signal, wherein said control signal includes motion device velocity information; and*

*a device coupled to said processor and adapted to provide said control signal to the motion device, whereby the determination of said control signal increases a velocity of the motion device relative to a first specified velocity while maintaining said motion device within said acceptable deviation range for said desired motion passing through the first 3D region.*

*51. The apparatus of claim 50, wherein said control signal is further based on an actual position of the motion device.*

*52. The apparatus of claim 50, wherein the acceptable deviation range is a dimensional deviation range.*

*53. The method of claim 52, wherein the motion device is a machine tool.*

*54. An apparatus for motion control for a motion device capable of receiving commands associated with a desired velocity, a trajectory, and an acceptable deviation range from the trajectory, the apparatus comprising:*

*a calculating means for determining a velocity parameter, the velocity parameter based on the trajectory, a predicted deviation from the trajectory, and the acceptable deviation range from the trajectory to maintain the motion device within the acceptable deviation range from the trajectory; and*

*a control means for operating the motion device, whereby the control means operates the motion device in accordance with the velocity parameter to maintain the motion device within the acceptable deviation range from the trajectory.*

*55. The apparatus of claim 54, wherein said velocity parameter corresponds to a velocity of the motion device and determining said velocity parameter includes maximizing the velocity of the motion device while keeping the predicted deviation from the trajectory of the motion device within the acceptable deviation range from the trajectory.*

*56. The apparatus of claim 55, further comprising a parsing means for receiving a part definition and for parsing said part definition into at least one segment, each said segment including an associated trajectory and an associated acceptable deviation range from the associated trajectory.*

*57. The apparatus of claim 56, wherein a first segment includes a first associated deviation range and a second segment includes a second associated deviation range, the second associated acceptable deviation range differing from the first acceptable deviation range.*

*58. The method of claim 54, wherein the motion device is a machine tool.*

*59. A method of tolerance based motion control of a motion device comprising the steps of:*

*receiving a desired trajectory for the motion device and an acceptable deviation range from the desired trajectory for the motion device;*

*determining at least a first velocity limitation of the motion device, the first velocity limitation being based on the desired trajectory and the acceptable deviation range from the desired trajectory;*

*monitoring an actual deviation of the motion device from the desired trajectory;*

*determining a commanded velocity of the motion device based on at least the first velocity limitation and the actual deviation to maintain a predicted position of the motion device within the acceptable deviation range from the desired trajectory; and*

*providing signals to move the motion device at the commanded velocity.*

*60. The method of claim 59, wherein the commanded velocity corresponds to a maximum velocity to move the motion device while maintaining the motion device within the acceptable deviation range from the desired trajectory.*

*61. The method of claim 59, wherein the motion device is a machine tool.*

*62. The method of claim 61, wherein the step of receiving the desired trajectory and the acceptable deviation range from the desired trajectory includes the step of receiving a part program including a plurality of motion commands which specify the desired trajectory and a plurality of tolerance commands which specify the acceptable deviation range from the desired trajectory.*

*63. The method of claim 62, further comprising the steps of:*

*parsing the plurality of motion commands based on the plurality of tolerance commands to generate a plurality of motion command segments, each motion command segment having a uniform acceptable deviation range, a first motion command segment having a first uniform acceptable deviation range from a first desired trajectory segment and a second motion command segment having a second uniform acceptable deviation range from a second desired trajectory segment different from the first uniform acceptable deviation range from the first desired trajectory segment; and*

*storing the plurality of motion command segments on a computer readable medium.*

*64. The method of claim 63, wherein the plurality of tolerance commands each specify at least one of a time and an area wherein the acceptable deviation range of the tolerance command is active.*

*65. The method of claim 59, wherein the first velocity limitation of the motion device is further based on at least one of a desired velocity, the desired trajectory, a curvature of the desired trajectory, a turning angle of the desired trajectory, and a rate of change in velocity.*

*66. The method of claim 59, wherein the first velocity limitation of the motion device is based further on a desired velocity and the commanded velocity is based on a maximum velocity to move the motion device while maintaining the motion device within the acceptable deviation range from the desired trajectory, the commanded velocity being greater than the desired velocity.*

*67. The method of claim 66, wherein the commanded velocity is the maximum velocity to move the motion device while maintaining the motion device within the acceptable deviation range from the desired trajectory.*

*68. The method of claim 59, wherein the acceptable deviation range is a dimensional deviation range.*

*69. A method of tolerance based motion control of a motion device comprising the steps of:*

*specifying a first tolerance for a first 3D region of space;*

*specifying a second tolerance for a second 3D region of space;*

*specifying a trajectory which passes through both the first 3D region of space and the second 3D region of space; and*

*controlling a velocity of the motion device to maintain the motion device within the first tolerance from the trajectory in the first 3D region of space and to maintain the motion device within the second tolerance from the trajectory in the second 3D region of space.*

*70. The method of claim 69, further comprising the step of providing a part program including a plurality of program instructions, wherein the plurality of program instructions, specify the first 3D region of space, specifying the first tolerance; specify the second 3D region of space, specify the second tolerance, and specify the trajectory.*

*71. The method of claim 70, wherein the second tolerance value is less than the first tolerance value.*

*72. The method of claim 69, wherein the first tolerance is specified for a first phase of the movement of the motion device and the second tolerance is specified for a second phase of the movement of the motion device, the second phase occurring after the first phase, wherein the second 3D region overlaps at least a portion of the first 3D region.*

*73. The method of claim 72, wherein the velocity of the motion device is controlled to maintain the motion device within the first tolerance value for a first portion of the trajectory passing through the first 3D region of space during the first phase and to maintain the motion device within the second tolerance for a second portion of the trajectory passing through the second 3D region of space during the second phase.*

*74. The method of claim 69, further comprising the steps of:*

*increasing the velocity of the motion device for a first portion of the trajectory based on the first tolerance and a first calculated machining error from the trajectory for the motion device; and*

*decreasing the velocity of the motion device for a second portion of the trajectory based on the first tolerance and a second calculated machining error from the trajectory for the motion device.*

*75. A method of tolerance based motion control of a motion device comprising the steps of:*

*associating for a first 3D region of space a first tolerance;*

*associating for a second 3D region of space a second tolerance, the second 3D region of space overlapping at least a portion of the first 3D region of space;*

*determining if a desired trajectory is contained in both of the first 3D region of space and the second 3D region of space and if so then dividing the desired trajectory into at least two trajectory segments, a first trajectory segment being contained in the first 3D region of space and a second trajectory segment being contained in the second 3D region of space;*

*determining at least a first velocity limitation of the motion device for the first trajectory segment based on the first tolerance; and*

*determining a commanded velocity of the motion device based at least on the first velocity limitation to maintain a predicted position of the motion device in the first 3D region of space within the first tolerance.*

*76. The method of claim 75, further comprising determining a second velocity limitation of the motion device for the second trajectory segment based on the second tolerance, wherein the commanded velocity of the motion device is further based on the second velocity limitation to maintain a predicted position of the motion device in the second 3D region of space within the second tolerance.*

*77. The method of claim 76, wherein the predicted position of the motion device in the first 3D region of space and the predicted position of the motion device in the second 3D region of space are based on feedback of an actual position of the motion device.*

*78. The method of claim 77, wherein the motion device is a machine tool, the first 3D region of space is a first machining space, and the second 3D region of space is a second machining space.*

* * * * *